United States Patent
Mo et al.

(10) Patent No.: US 10,331,745 B2
(45) Date of Patent: Jun. 25, 2019

(54) DYNAMIC SEARCH SERVICE

(75) Inventors: Stanley Mo, Portland, OR (US); Robert Staudinger, Freilassing (DE); Victor Szilagyi, London (GB); Gustavo D. Domingo Yaguez, Cordova (AR)

(73) Assignee: Intel Corporation, Santa Clara, CA (US)

( * ) Notice: Subject to any disclaimer, the term of this patent is extended or adjusted under 35 U.S.C. 154(b) by 670 days.

(21) Appl. No.: 13/976,492

(22) PCT Filed: Mar. 31, 2012

(86) PCT No.: PCT/US2012/031754
§ 371 (c)(1),
(2), (4) Date: Nov. 26, 2014

(87) PCT Pub. No.: WO2013/147909
PCT Pub. Date: Oct. 3, 2013

(65) Prior Publication Data
US 2015/0095366 A1     Apr. 2, 2015

(51) Int. Cl.
*G06F 16/957* (2019.01)
*G06F 16/9535* (2019.01)
(Continued)

(52) U.S. Cl.
CPC ........ *G06F 16/9535* (2019.01); *G06F 16/957* (2019.01); *H04N 21/25891* (2013.01);
(Continued)

(58) Field of Classification Search
CPC ............ G06F 17/301; G06F 17/30106; G06F 17/30864; G06F 17/30973;
(Continued)

(56) References Cited

U.S. PATENT DOCUMENTS 7,603,349 B1 *  10/2009  Kraft et al.
7,689,585 B2 *   3/2010  Zeng et al. ............ 707/999.104
(Continued)

FOREIGN PATENT DOCUMENTS

| CN | 102057376 A | 5/2011 |
| CN | 102141990 A | 8/2011 |
| WO | 2013147909 A1 | 10/2013 |

OTHER PUBLICATIONS

International Search Report and Written Opinion received for PCT application No. PCT/US2012/031754, dated Nov. 9, 2012, 9 pages.
(Continued)

*Primary Examiner* — Hosain T Alam
*Assistant Examiner* — Saba Ahmed
(74) *Attorney, Agent, or Firm* — Jordan IP Law, LLC

(57) ABSTRACT

Systems and methods may provide for implementing a dynamic search service. In one example, the method may include receiving information relating to a topic of interest to a user, analyzing the information to determine a search parameter, conducting a coordinated search of content utilizing a plurality of device, generating and gathering results of a coordinated search from the plurality of devices, and generating a result communication including at least one result of the coordinated search.

31 Claims, 2 Drawing Sheets

(51) Int. Cl.
    *H04N 21/258* (2011.01)
    *H04N 21/2665* (2011.01)
    *H04N 21/278* (2011.01)
    *H04N 21/475* (2011.01)
    *H04N 21/482* (2011.01)

(52) U.S. Cl.
    CPC ....... *H04N 21/2665* (2013.01); *H04N 21/278* (2013.01); *H04N 21/475* (2013.01); *H04N 21/4828* (2013.01)

(58) Field of Classification Search
    CPC ......... G06F 17/30988; G06F 17/30867; G06F 16/9535; G06F 16/957; H04N 21/25891; H04N 21/2665; H04N 21/678; H04N 21/475; H04N 21/4828
    USPC ........................................................ 707/769
    See application file for complete search history.

(56) References Cited

U.S. PATENT DOCUMENTS

| | | | | |
|---|---|---|---|---|
| 7,856,441 | B1* | 12/2010 | Kraft et al. | 707/758 |
| 8,935,238 | B2* | 1/2015 | Cohen et al. | 707/722 |
| 2005/0144162 | A1* | 6/2005 | Liang | 707/3 |
| 2005/0251690 | A1* | 11/2005 | Kuno | G06F 21/10 713/189 |
| 2007/0255702 | A1* | 11/2007 | Orme | G06F 17/30696 |
| 2008/0109433 | A1* | 5/2008 | Rose | G06F 17/30867 |
| 2008/0294619 | A1 | 11/2008 | Hamilton et al. | |
| 2009/0144271 | A1 | 6/2009 | Richardson et al. | |
| 2009/0171907 | A1* | 7/2009 | Radovanovic | 707/3 |
| 2009/0320097 | A1* | 12/2009 | Jackson | G06F 17/30545 726/3 |
| 2010/0070484 | A1* | 3/2010 | Kraft | G06F 17/30867 707/706 |
| 2010/0223275 | A1 | 9/2010 | Foulger et al. | |
| 2011/0191319 | A1* | 8/2011 | Nie | G06F 17/30864 707/706 |
| 2011/0219027 | A1* | 9/2011 | Uyama | G01C 21/32 707/769 |
| 2011/0219441 | A1* | 9/2011 | Garg | G06F 17/30864 726/9 |
| 2012/0030227 | A1 | 2/2012 | Mital et al. | |
| 2012/0278318 | A1* | 11/2012 | Reznik | 707/732 |

OTHER PUBLICATIONS

International Preliminary Report on Patentability received for PCT Patent Application No. PCT/US2012/031754, dated Oct. 9, 2014, 6 pages.

European Search Report for EPO Patent Application No. 12873277.3, dated Dec. 15, 2015, 8 pages.

\* cited by examiner

DYNAMIC SEARCH SERVICE

BACKGROUND

Technical Field

Embodiments generally relate to dynamic search services. More particularly, embodiments relate to utilizing at least one device to conduct a real-time, dynamic search for content.

Discussion

Search services may often be limited to a platform on which a device operates. For example, a user utilizing a cable set-top-box (STB) that is interested in a particular topic may only be able to search an electronic programming guide (EPG). Although the user may be able to input the same search into a web browser of a mobile computing device (e.g., a laptop), such an approach may only return results from the World Wide Web. The two devices typically do not communicate or coordinate in conducting search efforts.

BRIEF DESCRIPTION OF THE DRAWINGS

The various advantages or the embodiments of the present invention will become apparent to one skilled in the art by reading the following specification and appended claims, and by referencing the following drawings, in which:

DETAILED DESCRIPTION

Figure 1:
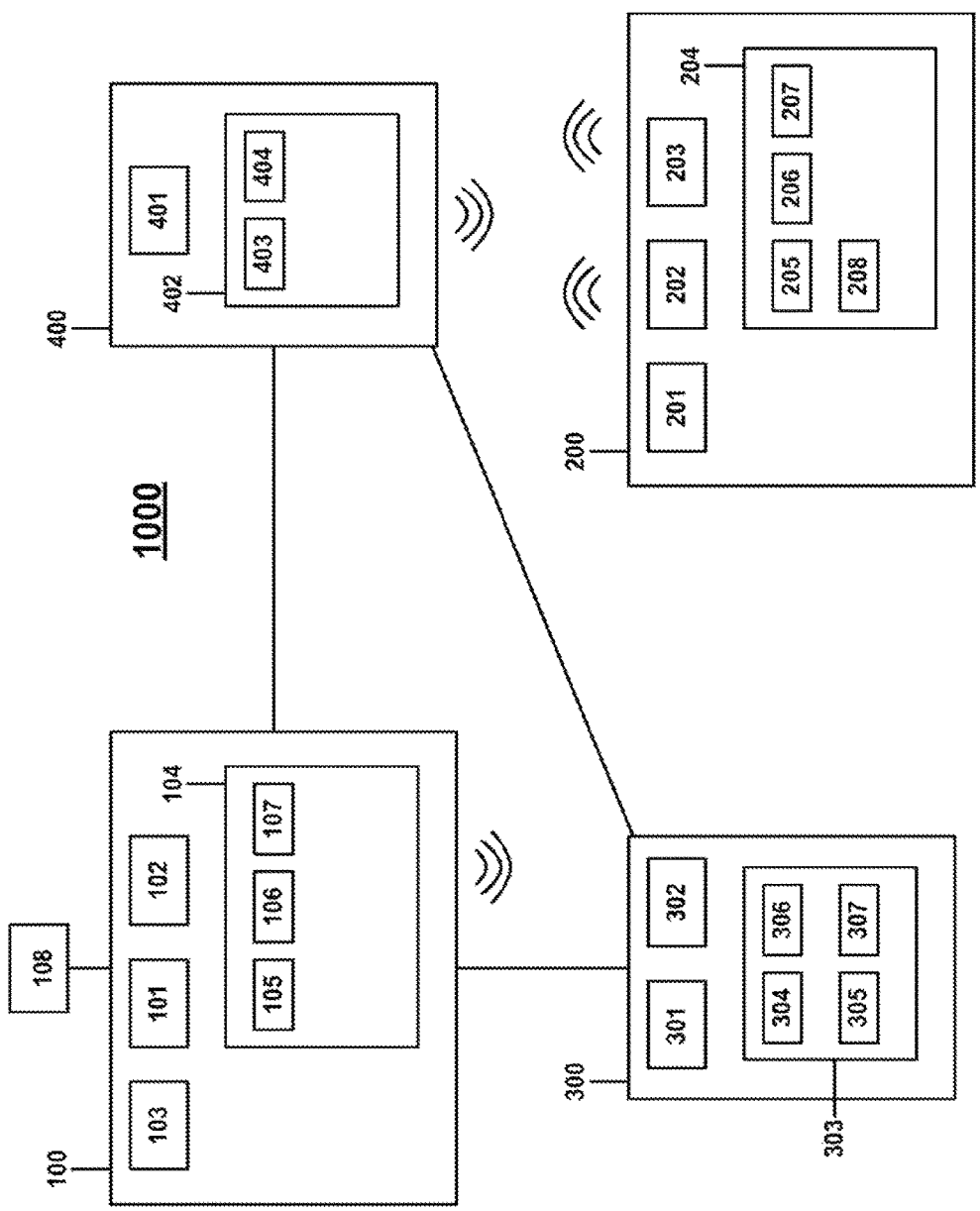
FIG. 1 is a block diagram of an example of a computing system for implementing a dynamic search service in accordance with an embodiment of the invention.

Turning now to FIG. 1, a block diagram of a computer system 1000 for implementing a dynamic search service is shown. The computer system 1000 may include STB 100, a first user device 200, a second user device 300, and a content provider device 400.

In this embodiment, a user may utilize the various devices included in the computing system 1000 to conduct a dynamic search. The dynamic search may include among other things, receiving information relating to a topic of interest to a user, analyzing the information to determine search parameters, providing suggestions regarding search parameters, conducting coordinated searches of content between the devices, generating and gathering the results of the searches from the various devices, and transmitting a result communication to the user.

The content that may be searched may include any information that may be searched by a programmable device. Examples of content that may be searched by devices may include, among other things, EPG data, closed captioning (CC) data, subtitle data, video data, audio data, Global Positioning System (GPS) data, information available on the World Wide Web, or any other information that may be searchable by a programmable machine (e.g., the STB 100, the first user device 200, etc.).

The parameters that may be used to conduct the search may include any information, from any source, that may be used to define a search to be performed. For example, the parameters of a search may include, among other things, search criteria and scope of the search. Examples of search criteria that may be considered in formulating a search may include, among other things, a user selection (e.g., clicking a hyperlink, a user gesture to select a search term, etc.), user input (e.g., a typed search term), related terms, related concepts, or the like. Example of parameters related to a scope of a search may include, among other things, the type of content to be searched (e.g., video content, audio content), time and location parameters (e.g., how old a content source is, the amount of time the search should be conducted, time of day, Global Positioning System (GPS) data, etc.), and user preferences (e.g., the number of results the user prefers), or the like.

In embodiments of the present invention, at least one device may include a dynamic search application to facilitate a dynamic search. For example, as will be discussed in greater detail, each of the STB 100, the first user device 200, the second user device 300, and the content provider device 400 may include a dynamic search application to facilitate a dynamic search.

The STB 100 may be a device that converts a content signal for display on a display device. The STB 100 may include a STB processor 101, a STB first tuner 102, a STB second tuner 103, and a STB memory component 104. The STB 100 may be coupled to a display device 108 (e.g., a television). In this example, the user may be using the STB and the display device 108 to view a broadcast evening news program that is being delivered by the content provider device 400.

The STB processing component 101 may include at least one computer processor that may be utilized to execute computer-readable executable instructions. For example, as will be discussed in greater detail, the STB processing component 101 may be configured to execute various software applications relating to a dynamic search service.

The STB first tuner 102 may allow content signals to be received by the STB 100, and may capture (i.e., record) the content signals for playback. Similarly, the STB second tuner 103 may also receive content signals (separate from the STB first tuner 102), and may capture the content signals for playback as well.

The STB transceiver 103 may be a transmitter/receiver that enables the STB 100 to wirelessly communicate with other devices (e.g., the first user device 200). In this embodiment, the STB 100 and the first user device 200 may communicate wirelessly via Bluetooth (e.g., IEEE 802.15.1-2005, Wireless Personal Area Networks). In other embodiments, the STB 100 and the first user device 200 may communicate, for example, via a wireless data connection (e.g., IEEE 802.11, 1999 Edition, LAN/MAN Wireless Wireless LANS (Wi-Fi), IEEE 802.16-2004, LAN/MAN Broadband Wireless LANS (WiMAX), Zigbee (IEEE 802.15.4), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE PI675), USB Universal Serial Bus 2.0 Specification)) etc., depending upon the circumstances.

The STB memory component 104 may be any device configured to store data. In this example, the STB memory 104 may store, among other things, a STB dynamic search application 105, STB continuous search parameters 106, and STB continuous search results 107.

The STB dynamic search application 105 may be an application configured to enable the user device 100 to implement the dynamic search service. More specifically, as will be discussed in greater detail, the STB dynamic search application 105 may be configured to, among other things, receive information relating to a topic of interest to a user, analyze the information to determine search parameters, provide suggestions regarding search parameters, conduct coordinated searches of content between the devices, and gather the results of the searches from the various devices, and transmit a result communication to the user.

The STB continuous search parameters 106 may include parameters relating to continuous search requested by the user. A continuous search may be a search requested by user that is to be performed until it is discontinued by the user.

The user may utilize the STB dynamic search application 105 to request the continuous search be performed. So, in this example, the STB dynamic search application 105 may allow the user to request a continuous search relating to the user's favorite football team, the San Francisco 49ers. For example, the STB dynamic search application 105 may offer a GUI (displayed on the display device 100) to allow the user to submit relevant terms, such as "San Francisco 49ers" and "news". The STB dynamic search application 1105 may use this information to generate the STB discontinuous search parameters 106.

A dynamic search application may also be configured to suggest other relevant criteria. So, in this example, upon receiving the terms input by the user, the STB dynamic search application 105 may suggest other relevant terms that may be used as well (e.g., "draft pick", "waiver wire"). The user may then accept or decline these suggestions.

In addition, a dynamic search application may dynamically determine the search parameters. Indeed, the search parameters may be defined solely by the dynamic search application, may be defined solely by the user, or may be defined by a combination of input from the user and the dynamic search application. So, in this example, the STB dynamic search application 105 may utilize the user input (i.e., "news") to determine that the user is only interested in the most recent news relating to the San Francisco 49ers, and the scope of the continuous search should be limited accordingly.

Upon determining search parameters, a dynamic search application may initiate a search in a coordinated mariner amongst any coupled devices (e.g., devices in the computer system 1000). So, in this example, the STB dynamic search application 105 may transmit a communication (which may include the STB continuous search parameters 106) to other coupled devices (e.g., the second STB 400) to direct the devices to conduct the continuous search in a coordinated manner.

Moreover, a coordinated search amongst a plurality of devices may be such that search efforts are not repeated amongst the devices. The devices may communicate amongst themselves (e.g., utilizing the dynamic search application located on the devices) and work together to ensure that when one device is conducting a particular aspect of the search, the other devices conduct another aspect of the search. So, for example, if the STB dynamic search application 105 is conducting a search for San Francisco 49ers news on a particular channel (e.g., channel 10), the STB dynamic search application 105 will communicate with the other devices (e.g., the content provider device 400) to ensure that this effort is not repeated.

A coordinated search may also be such that results that are returned from searches by the various devices are communicated between the devices (e.g., utilizing the dynamic search application located on the devices). So, for example, results generated by the first user device 200 in conducting the continuous search may be received and accounted for by the STB device 100, and the result of the searches by the devices may be stored in the STB memory component 104 as the STB continuous search results 107.

Furthermore, the results generated by the various devices may be gathered by the dynamic search applications located on the devices for presentation to the user. For example, the results may be gathered with regard to, among other things, a device that the user is currently using, a user preference (e.g., which may have been previously set by the user), a format of the returned result, or relevance of a returned result. So, in this example, the user is actively using the STB 100 (coupled to a television display) and the first user device 200 (i.e., a tablet device). So, if the STB continuous search results 107 include video results for presentation to the user, the STB dynamic search application 105 may present the results of a search in the form of video clip thumbnails, and may utilize a popup to alert the user of the completion of the search. The results may also be ordered by, for example, relevance (e.g., using a relevancy score) or by user preference (e.g., the user prefers to see no more than ten results of a search at a time).

Upon receiving results of the search, the user may utilize a dynamic search application to dynamically adjust the search parameters or to provide feedback. So, for example, if the STB continuous search results 107 includes a list of five programs including information relating to the San Francisco 49ers, the STB dynamic search application 105 may allow the user to indicate that two programs of the five are of particular interest, and that, going forward, the continuous search should be conducted accordingly. For example, the STB dynamic search application may utilize a GUI to receive user feedback by allowing the user to arrange the two results horizontally (e.g., to indicate that they are of equal importance), or arrange them vertically (e.g., indicating an order of prioritization).

The first use device 200 may be, among other things, any programmable machine that may carry out a sequence of logical operations. Examples of the first user device 200 may include a laptop, desktop, personal digital assistant (PDA), media player, a mobile Internet device (MID), any smart device such as a smart phone, smart tablet, smart TV, or the like. In this embodiment the computing device 100 may be a tablet device. The first user device 200 may include a first user device processor 201, a first user device interface 202, a first user device transceiver 203, and a first user device memory component 204.

The first user device processor 201 may include at least one computer processor that may be utilized to execute computer-readable executable instructions. For example, as will be discussed in greater detail, the first user device processor 201 may be configured to execute various software applications relating to a dynamic search service.

The first user device interface 202 may be a component configured to allow a user to interact with the user device 200. For example, in this embodiment, the first user device interface 202 may be a tablet device screen including a graphical user interface (GUI). in other embodiments, the first use device interface 202 may be a laptop screen, a tablet device screen, a desktop monitor, or the like.

The first user device transceiver 203 may be a transmitter/receiver that enables the first user device 200 to wirelessly communicate with other devices (e.g., the STB 100, the content provider device 500). In this embodiment, the first user device 200 and the current content provider device 500 may communicate wirelessly via Wi-Fi (e.g., LAN/MAN Wireless LANS (Wi-Fi), IEEE 802.16-2004). In other embodiments, the STB 100, the first user device 200, and the content provider device 500 may communicate wirelessly via various other communication protocols.

The first user device memory component 204 may be any device configured to store data. In this example, the first user device memory component 204 may store, among other things, a first user device dynamic search application 205, first user device continuous search parameters 206, and first user device directed search parameters 207, and the first user device directed search results 208.

Similar to the STB dynamic search application 105, the first user device dynamic search application 205 may be an application configured to enable the first user device 200 to implement the dynamic search. Also, similar to the STB continuous search parameters 106, the first user device continuous search parameters 206 may include information relating to a continuous search requested by the user relating to the San Francisco 49ers. So, for example, while the STB dynamic search application 105 may be conducting the user's requested continuous search with respect to the channels being broadcast on the STB device 100, the first user device 200 may utilize the first user device dynamic search application 205 to conduct the continuous search in a coordinated manner by searching the World Wide Web.

Indeed, in one example, the first user device dynamic search application 205 may be configured to search social networks. Searching social networks may allow the first user device dynamic search application to generate results that may be determined by other users searching for similar content. As such, the search conducted by the first user device dynamic search application may be even more distributed and efficient.

The first user device directed search parameters 207 may include information relating to a directed search requested by the user. A directed search may be a search that is limited (e.g., limited to real-time, limited by number of search iterations, etc.). So, in this example, the user may utilize the STB the first user device interface 202 to input the first user device directed search parameters 207 to enable the first user device dynamic search application 205 to conduct a directed search to generate current information relating to an earthquake in Haiti (being shown on the broadcast news program the user is viewing). More specifically, the user may request the directed search by selecting a button offered in a GUI offered by the first user device dynamic search application 205 (and displayed on the first user device interface 202).

Upon receiving the request, the first user device dynamic search application 205 may utilize this information to determine search parameters. More specifically, the first user device dynamic search application 205 may analyze the content (e.g., CC data being broadcast at or near the time of the user's request) to determine that the user has made a request relating to the earthquake in Haiti. The first user device dynamic search application 205 may initiate the search, and communicate this request to other coupled devices (e.g., the second STB 400) to allow the devices to conduct a directed search in a coordinated manner for any information relating to the earthquake in Haiti. For example, the STB first tuner 102 and the STB second tuner 103 of the STB device 100 may conduct a search of the television channels being broadcast, while the first user device 200 may conduct a search on the Internet. Upon completion of the directed search, the first user device memory component 204 may store the first user device directed search results 208 for presentation to the user.

Turning now to the second user device 300, the second user device 300 may be, among other things, any programmable machine that may carry out a sequence of logical operations. In this embodiment the second user device 300 may be a desktop computer. The second user device 300 may include a second user device processor 301, a second user device sensor configuration 302, and a second user device memory component 303.

The second user device processor 301 may include at least one computer processor that may be utilized to execute computer-readable executable instructions. For example, as will be discussed in greater detail, the second user device processor 301 may be configured to execute various software applications relating to a dynamic search service.

The second user device sensor configuration 302 may be an arrangement of at least one sensor configured to measure attributes relating to the surroundings of the second user device 300. In this example, the second user device sensor configuration 302 may include a barometer to detect changes in atmospheric pressure to help the user determine whether rain may be on the way. In this example, a predetermined change in barometric pressure may cause the second user device sensor configuration 302 to transmit a signal.

The second user device memory component 303 may be any device configured to store data. In this example, the second user device memory component 303 may store, among other things, a second user device dynamic search application 304, second user device continuous search parameters 305, second user device triggered search parameters 306, and second user device triggered search results 307.

Similar to the STB dynamic search application 105, the second user device dynamic search application 304 may be an application configured to enable the second user device 300 to implement the dynamic search service. Also, similar to the STB continuous search parameters 106, the second user device continuous search parameters 305 may include information relating to a continuous search requested by the user relating to the San Francisco 49ers. So, in this example, while the STB 100 may be conducting the user's requested continuous search with respect to the channels being broadcast on the STB device 100, the second user device 300 may utilize the second STB dynamic search application 304 to conduct the continuous search by searching the World Wide Web in a coordinated manner (i.e., along with the first user device 200).

The second user device triggered search parameters 306 may include information relating to a triggered search requested by the user. A triggered search may be a search that is triggered automatically by an event. In this example, upon receiving a signal from the second user device sensor configuration 302, the second user device dynamic search application 304 may access the second user device triggered search parameters 306 to determine that a search for any information relating an indication that rain may be on the way (e.g., a local weather report) should be initiated. Accordingly, the second user device dynamic search application 304 may initiate a search, and may communicate this request to other coupled devices (e.g., the second STB 400) to allow the devices conduct a triggered search in a coordinated manner. Upon completion of the triggered search, the second user device dynamic search application 304 may store the second user device triggered search results 307 in the second user device memory component 303, and may transmit a results communication (including the second user device triggered search results 307) to another device (e.g., the first user device 200).

The content provider device 400 may be among other things, any programmable machine that may carry out a sequence of logical operations to broadcast content at user.

In this embodiment the content provider device may be a computer server device that may be configured to broadcast content to the STB 100, the first user device 200, and the second user device 300. The content provider device 400 may include a content provider device processor 401 and a content provider device memory component 502.

The content provider device processor 401 may include at least one computer processor that may be utilized to execute computer-readable executable instructions. For example, as will be discussed in greater detail, the content provider device processor 401 may be configured to execute various software applications relating to a dynamic search service.

The content provider device memory component 402 may be any device configured to store data. In this example, the content provider device memory component 402 may store, among other things, a content provider device dynamic search application 403 and content provider device continuous search parameters 404.

Similar to the STB dynamic search application 105, the content provider device dynamic search application 403 may be an application configured to enable the content provider device 400 to implement the dynamic search service. Also, similar to the STB continuous search parameters 106, the content provider device continuous search parameters 404 may include information relating to a continuous search requested by the user relating to the San Francisco 49ers. So, for example, while the STB 100 may be conducting the user's requested continuous search with respect to certain channels being broadcast on the STB device 100, the content provider device 400 may be configured to conduct a coordinated search by searching other channels.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment described in FIG. 1, as discussed above, the devices in the computer system 1000 may coordinate to perform a particular search. That is, for example, upon receiving a directed search from a user, the devices may conduct a search in a coordinate manner to generate and gather results. Accordingly, the devices may be configured to operate (e.g., conduct a search) in a decentralized, distributive manner. However, this need not necessarily be the case. In other embodiments, one, central device (e.g., the content provider device 400) may be configured to direct one or more coupled devices to conduct a dynamic search in a coordinated manner. Indeed, in one embodiment a central device may not be configured to search at all, and may instead merely direct other devices to conduct searches.

Also, in the example described above, the dynamic search applications may conduct a continuous search, a directed search, and a triggered search. However, embodiments of the present are not limited in the types of searches that may be performed. Indeed, embodiments of the present invention may be configured to perform any other type of search in a coordinated manner that may be required.

Figure 2:
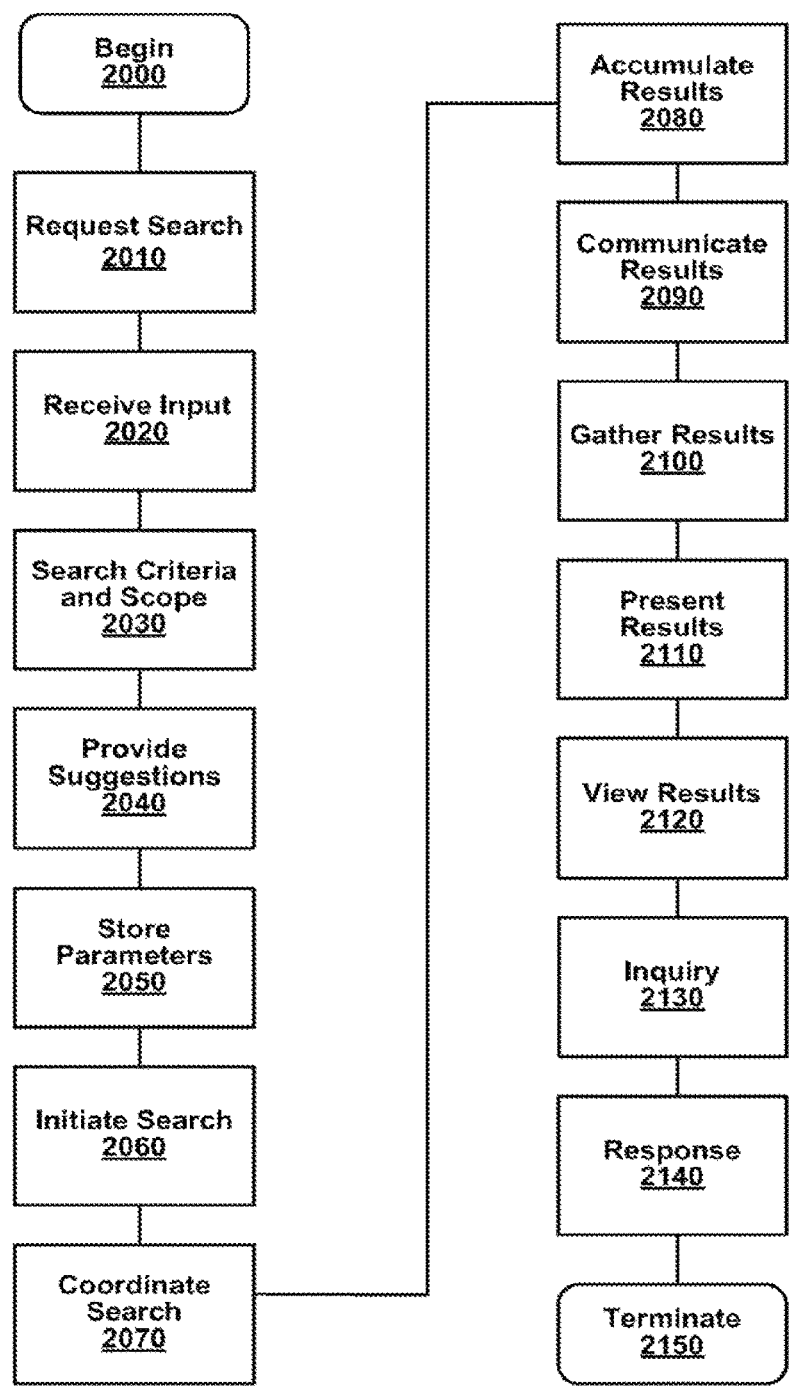
FIG. 2 is a flowchart of an example of a method of implementing a dynamic search service in accordance with an embodiment of the invention.

Turning now to FIG. 2, a flowchart of an example of a method of implementing a dynamic search service in accordance with an embodiment of the invention is shown. In this example, a user may be utilizing a user device, such as the first user device 200 (FIG. 1), while viewing television programming utilizing a STB, such as the STB 100 (FIG. 1). Also, in this example, the user may utilize the tablet device and the STB to initiate a directed search for current information relating to the user's favorite professional football team, the San Francisco 49ers.

The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 2000. At processing block 2010, the user may utilize a dynamic search application located on the user device, such as the first user device dynamic search application 205 (FIG. 1), to request a directed search. The user device dynamic search application may provide a GUI including a search bar to receive input relating to the topic of interest to the user. At processing block 2020, the user may input the search terms "San Francisco 49ers" and "current" into the search bar. At processing block 2030, the use device dynamic search application may determine that the search criteria may be information relating to the San Francisco 49ers, and the scope of the search should be limited only to the most recent information. At processing block 2040, the user device dynamic search application may provide suggestions regarding the criteria and the scope, such as asking whether to include related search criteria such as "draft pick" or "waiver wire", and whether to limit be scope or the search to materials published in the last twenty-four hours. At processing block 2050, the user may answer these queries, and the user device dynamic search application may store the directed search parameters, such as the first user device directed search parameters 207 (FIG. 1), on a local memory, such as the first user device memory component 204 (FIG. 1).

At processing block 2060, the user device dynamic search application may initiate a coordinated search by transmitting the directed search parameters to a dynamic search application located on the STB, such as the STB dynamic search application 105 (FIG. 1). At processing block 2070, upon receiving the search parameters, the STB dynamic search application may utilize a STB first tuner, such as the STB first tuner 102 (FIG. 1), and a STB second tuner, such as the STB second tuner (FIG. 1), to conduct a search on broadcast television content available on the STB for the recent information relating to the San Francisco 49ers. The STB dynamic search application may coordinate the search activities to ensure that efforts are not repeated by ensuring that the STB tuner searches different channels than the second STB tuner.

At processing block 2080, the user device dynamic search application and the STB dynamic search applications may accumulate results from their respective searches. At processing block 2090, the user device dynamic search application and the STB dynamic search application may continue the coordinated search by communicating their respective returned results. In this example, the STB dynamic search application may transmit an STB result communication including the STB's search results to the user device. In this example, the STB's search results may include two thirty-second video clips relating to the San Francisco 49ers.

At processing block 2100, the user device dynamic search application may generate and gather the results from its own World Wide Web search, along with the results from the STB search, in a manner that is most suitable for the user device (i.e., the device where the search request originated). In this example, this may include providing the top ten World Wide Web search results, and the two video clips sent from the STB device.

At processing block 2110, the user device dynamic search application may present the results to the user in manner that is most suitable for the user device. In this example, the user device dynamic search application may provide a popup icon to indicate the search has been completed. The popup icon may be selected to link to a file including the gathered search results.

At processing block 2120, the user may click the popup icon, and view the gathered search results. At processing block 2130, the user device dynamic search application may inquire whether the user would like to dynamically adjust the search parameters or provide feedback. At processing block 2140, the user may indicate that no adjustment or feedback is necessary. At processing block 2150, the process may terminate.

The sequence and numbering of blocks depicted in FIG. 2 is not intended to imply an order of operations to the exclusion of other possibilities. Those of skill in the art will appreciate that the foregoing systems and methods are susceptible of various modifications, variations, and alterations.

For example, in the embodiment illustrated in FIG. 2, the user device dynamic search applications and the STB dynamic search application may conduct a directed search for recent information relating to the San Francisco 49ers. However, embodiments of the present are not limited in the types of searches that may be performed. Indeed, embodiments of the present invention may be configured to perform any other type of search in a coordinated manner that may be required. So, for example, in another embodiment, the STB dynamic search application and the user device dynamic search application may be configured to conduct a continuous search.

Embodiments may therefore provide a method of implementing a dynamic search service, including receiving information relating to a topic of interest to a user, analyzing the information relating to the topic of interest to the user to determine a search parameter, and providing a suggestion relating to the search parameter. The method may also include adjusting the search parameter utilizing feedback and conducting a coordinated search of content utilizing a plurality of devices.

In one example, the method may include generating a result of the coordinated search of content utilizing the plurality of devices.

In another example, the method may include generating a result communication including the result of the coordinated search of content.

In one example, the search parameter is one or more of a search criteria and a scope of search.

In one example, the coordinated search is one or more of a continuous search, a directed search, and a triggered search.

In still another example, the coordinated search of content includes not repeating a search effort between the plurality of devices.

In another example, the coordinated search of content includes sharing results between the plurality of devices.

Embodiments may also include at least one machine readable medium comprising a plurality of instructions that in response to being executed on a computing device, cause the computing device to carry out any of the examples of the aforementioned method. Another embodiment may provide an apparatus for implementing a dynamic search service comprising a processor and logic configured to perform any of the examples of the aforementioned method. Still another embodiment may provide a system for implementing a dynamic search service comprising a first device including a first device processor and a first device memory component and a second device including a second device processor and logic configured to perform any of the examples of the aforementioned method.

Other embodiments may involve a method of implementing a dynamic search service comprising receiving information relating to a topic of interest to a user and analyzing the information relating to a topic of interest to a user to determine a search parameter, and conducting a coordinated search of content utilizing a plurality of devices.

In one example, the method may include providing a suggestion relating to the search parameter.

In another example, the method may include adjusting the search parameter utilizing feedback.

In another example, the search parameter may be one or more of a search criteria and a scope of search.

In another example, the method may include generating a result of the coordinated search of content utilizing the plurality of devices.

In another example, the method may include generating a result communication including the result of the coordinated search of content.

In another example, the coordinated search of content may be one or more as continuous search, a directed search, and a triggered search.

In another example, the coordinated search of content may include not repeating a search effort between the plurality of devices.

In another example, the coordinated search of content may include sharing results between the plurality of devices.

Embodiments may also include at least one machine readable medium comprising a plurality of instructions that in response to being executed on a computing device, cause the computing device to carry out any of the examples of the aforementioned method. Another embodiment may provide an apparatus for implementing a dynamic search service comprising a processor and logic configured to perform any of the examples of the aforementioned method. Still another embodiment may provide a system for implementing a dynamic search service comprising a first device including a first device processor and a first device memory component and a second device including a second device processor and logic configured to perform any of the examples of the aforementioned method.

Embodiments may also provide for a system comprising a first device including a first processing component, a first device receiving module to receive information relating to a topic of interest to a user, and a first device analyzing module to analyze the information relating to the topic of interest to the user to determine a search parameter. The first device may also include a first device suggestion module to provide a suggestion relating to the search parameter, and a first device transmitting module to transmit a search communication directing a coordinated search of content, wherein the search communication includes the search parameter, and wherein the first device receiving module is to receive a first result communication including a first result. The system may also include a second device having a second processing component, a second device receiving module to receive the search communication directing the coordinated search of content, a second device search module to conduct a first search utilizing the search parameter and generate the first result relating to the search parameter, and a second device result module to generate the first result communication including the first result.

In one example, the first device includes a first device search module to conduct a second search utilizing the search parameter.

In another example, the first device a first device result module to generate a second result communication including a second result.

Embodiments may also include a computer readable storage medium comprising a set of instructions for implementing a dynamic search service which, if executed by a processor, cause a computer to receive information relating to a topic of interest to a user analyze the information relating to a topic of interest to a user to determine a search parameter, and conduct a coordinated search of content utilizing a plurality of devices. The set of instructions may also generate a result of the coordinated search of content utilizing the plurality of devices and generate a result communication including the result of the coordinated search of content.

Still another embodiment may provide an apparatus comprising an interface, a processing component, and a memory device. The memory device may include a receiving module to receive information relating to a topic of interest to a user and an analyzing module to analyze the information relating to a topic of interest to as user to determine a search parameter. The memory device may also include a search module to conduct a coordinated search of content utilizing as plurality of devices, a result module to generate a result of the coordinated search of content utilizing the plurality of devices, and a result communication module to generate a result communication including the result of the coordinated search of content.

In one example, the memory device further includes a suggestion module to provide a suggestion relating to the search parameter.

In another example, the memory device further includes an adjustment module to adjust the search parameter utilizing feedback.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations known as "IP cores" may be stored on a tangible, machine readable medium and supplied to various customers or manufacturing facilities to load into the fabrication machines that actually make the logic processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In as series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable non-erasable media, writeable or re-writeable media, digital or analog media, hard disk, floppy disk, Compact Disk Read Only Memory (CD-ROM), Compact Disk Recordable (CD-R), Compact Disk Re-writeable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system, comprising:
   a first user device including,
      a first processing component;
      a first device receiving module comprising a circuit to receive information relating to a topic of interest to a user;
      a first device analyzing module comprising a circuit to analyze the information relating to the topic of interest to the user to determine a search parameter;
      a first device suggestion module comprising a circuit to provide a suggestion relating to the search parameter; and
      a first device transmitting module comprising a circuit to transmit a search communication directing a coordinated search of content, wherein the search communication includes the search parameter, and wherein the first device receiving module is to receive a first result communication including a first result; and
   a second user device including;
      a second processing component;
      a second device receiving module comprising a circuit to receive the search communication directing the coordinated search of content between the first user device and the second user device;
      a second device search module comprising a circuit to conduct a first search utilizing the search parameter and generate the first result relating to the search parameter; and
      a second device result module comprising a circuit to generate the first result communication including the first result.

2. The system of claim 1, further including a first device search module comprising a circuit to conduct a second search utilizing the search parameter.

3. The system of claim 1, further including a first device result module comprising a circuit to generate a second result communication including a second result.

4. The system of claim 1, wherein the search parameter is to be one or more of a search criteria and a scope of search.

5. The system of claim 1, wherein the coordinated search of content is to be one or more of a continuous search, a directed search, and a triggered search.

6. The system of claim 1, wherein the coordinated search of content is to include not repeating a search effort between the first device and the second device.

7. The system of claim 1, wherein the coordinated search of content is to include sharing results between the first device and the second device.

8. A method, comprising:
   receiving information relating to a topic of interest to a user;
   analyzing the information relating to a topic of interest to a user to determine a search parameter; and
   conducting a coordinated search of content, wherein the conducting of the coordinated search comprises transmitting a search communication directing the coordinated search of content via a first device transmitting module comprising a circuit associated with a first user device and receiving the search communication directing the coordinated search of content via a second device receiving module comprising a circuit associated with a second user device.

9. The method of claim 8, including providing a suggestion relating to the search parameter.

10. The method of claim 8, including adjusting the search parameter utilizing feedback.

11. The method of claim 8, wherein the search parameter is one or more of a search criteria and a scope of search.

12. The method of claim 8, including generating a result of the coordinated search of content utilizing the plurality of devices.

13. The method of claim 12, including generating a result communication including the result of the coordinated search of content.

14. The method of claim 8, wherein the coordinated search of content is one or more of a continuous search, a directed search, and a triggered search.

15. The method of claim 8, wherein the coordinated search of content includes not repeating a search effort between the plurality of user devices.

16. The method of claim 8, wherein the coordinated search of content includes sharing results between the plurality of user devices.

17. At least one non-transitory computer readable storage medium comprising a set of instructions which, if executed by a processor, cause a computer to:
receive information relating to a topic of interest to a user;
analyze the information relating to a topic of interest to a user to determine a search parameter;
conduct a coordinated search of content utilizing a plurality of user devices, wherein the conducting of the coordinated search comprises transmission of a search communication to direct the coordinated search of content via a first device transmitting module comprising a circuit associated with a first user device and reception of the search communication to direct the coordinated search of content via a second device receiving module comprising a circuit associated with a second user device;
generate a result of the coordinated search of content utilizing the plurality of user devices; and
generate a result communication including the result of the coordinated search of content.

18. The at least one medium of claim 17, wherein, if executed, the set of instructions cause a computer to provide a suggestion relating to the search parameter.

19. The at least one medium of claim 17, wherein, if executed, the set of instructions cause a computer to adjust the search parameter utilizing feedback.

20. The at least one medium of claim 17, wherein the search parameter is to be one or more of a search criteria and a scope of search.

21. The at least one medium of claim 17, wherein the coordinated search is to be one or more of a continuous search, a directed search, and a triggered search.

22. The at least one medium of claim 17, wherein the coordinated search of content is to include not repeating a search effort between the plurality of user devices.

23. The at least one medium of claim 17, wherein the coordinated search of content is to include sharing results between the plurality of user devices.

24. An apparatus, comprising:
an interface;
a processing component; and
a receiving module to receive information relating to a topic of interest to a user;
an analyzing module to analyze the information relating to a topic of interest to a user to determine a search parameter;
a search module to conduct a coordinated search of content utilizing a plurality of user devices, wherein the conducting of the coordinated search comprises transmission of a search communication to direct the coordinated search of content via a first device transmitting module comprising a circuit associated with a first user device and reception of the search communication to direct the coordinated search of content via a second device receiving module comprising a circuit associated with a second user device;
a result module to generate a result of the coordinated search of content utilizing the plurality of user devices; and
a result communication module to generate a result communication including the result of the coordinated search of content.

25. The apparatus of claim 24, wherein further including a suggestion module comprising a circuit to provide a suggestion relating to the search parameter.

26. The apparatus of claim 24, further including an adjustment module comprising a circuit to adjust the search parameter utilizing feedback.

27. The apparatus of claim 24, wherein the search parameter is to be one or more of a search criteria and a scope of search.

28. The apparatus of claim 24, wherein the coordinated search is to be one or more of a continuous search, a directed search, and a triggered search.

29. The apparatus of claim 24, wherein the coordinated search of content is to include not repeating a search effort between the plurality of user devices.

30. The apparatus of claim 24, wherein the coordinated search of content is to include sharing results between the plurality of user devices.

31. The apparatus of claim 24, wherein at least one of the plurality of user devices is to include a set top box.

* * * * *